(12) United States Patent
Gharib et al.

(10) Patent No.: US 9,524,021 B2
(45) Date of Patent: Dec. 20, 2016

(54) IMAGING SURROUND SYSTEM FOR TOUCH-FREE DISPLAY CONTROL

(71) Applicants: Morteza Gharib, Altadena, CA (US); David Jeon, Pasadena, CA (US)

(72) Inventors: Morteza Gharib, Altadena, CA (US); David Jeon, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 14/319,653

(22) Filed: Jun. 30, 2014

(65) Prior Publication Data
US 2015/0009149 A1 Jan. 8, 2015

Related U.S. Application Data

(63) Continuation of application No. PCT/US2012/059077, filed on Oct. 5, 2012.

(60) Provisional application No. 61/590,251, filed on Jan. 24, 2012, provisional application No. 61/589,182, filed on Jan. 20, 2012, provisional application No. 61/583,539, filed on Jan. 5, 2012.

(51) Int. Cl.
| | | |
|---|---|---|
| *G06F 3/00* | (2006.01) |
| *G06F 3/01* | (2006.01) |
| *G06F 3/03* | (2006.01) |
| *G06F 3/02* | (2006.01) |
| *G06K 9/00* | (2006.01) |

(52) U.S. Cl.
CPC .............. *G06F 3/005* (2013.01); *G06F 3/011* (2013.01); *G06F 3/017* (2013.01); *G06F 3/021* (2013.01); *G06F 3/0227* (2013.01); *G06F 3/0304* (2013.01); *G06K 9/00335* (2013.01)

(58) Field of Classification Search
None
See application file for complete search history.

(56) References Cited

U.S. PATENT DOCUMENTS

| | | |
|---|---|---|
| 4,644,390 A | 2/1987 | Ochi |
| 4,675,535 A | 6/1987 | Tsunekawa |
| 6,229,913 B1 | 5/2001 | Nayar et al. |
| 6,278,847 B1 | 8/2001 | Gharib et al. |
| 6,538,255 B1 | 3/2003 | Nakasuji |

(Continued)

FOREIGN PATENT DOCUMENTS

| | | |
|---|---|---|
| CA | 2699876 | 10/2010 |
| EP | 0585098 | 3/1994 |

(Continued)

OTHER PUBLICATIONS

Chaudhuri, S., et al., "Depth From Defocus: A Real Aperture Imaging Approach", Springer, 1999.

(Continued)

*Primary Examiner* — Kenneth B Lee, Jr.
(74) *Attorney, Agent, or Firm* — One LLP (57) ABSTRACT

The subject system hardware and methodology combine disparate cameras into a cohesive gesture recognition environment. To render an intended computer, gaming, display, etc. control function, two or more cameras with non-coaxial axes are trained on a space to detect and lock onto an object image regardless of its depth coordinate. Each camera captures one 2D view of the gesture and the plurality of 2D gestures are combined to infer the 3D input.

21 Claims, 3 Drawing Sheets

(56) References Cited

U.S. PATENT DOCUMENTS

| | | |
|---|---|---|
| 6,900,841 B1 | 5/2005 | Mihara |
| 6,993,179 B1 | 1/2006 | Weinshall et al. |
| 7,006,132 B2 | 2/2006 | Pereira et al. |
| 7,102,686 B1 | 9/2006 | Orimoto et al. |
| 7,466,336 B2 | 12/2008 | Regan et al. |
| 7,586,675 B2 | 9/2009 | Sander |
| 7,612,869 B2 | 11/2009 | Pereira et al. |
| 7,612,870 B2 | 11/2009 | Graff et al. |
| 7,667,768 B2 | 2/2010 | Orimoto et al. |
| 7,711,201 B2 | 5/2010 | Wong et al. |
| 7,819,591 B2 | 10/2010 | Rohaly et al. |
| 7,843,429 B2 | 11/2010 | Pryor |
| 7,843,487 B2 | 11/2010 | Tojima |
| 7,996,793 B2 | 8/2011 | Latta et al. |
| 8,068,095 B2 | 11/2011 | Pryor |
| 8,111,239 B2 | 2/2012 | Pryor et al. |
| 8,111,904 B2 | 2/2012 | Wallack et al. |
| 8,295,546 B2 | 10/2012 | Craig et al. |
| 8,379,101 B2 | 2/2013 | Mathe et al. |
| 8,487,938 B2 | 7/2013 | Latta et al. |
| 8,564,534 B2 | 10/2013 | Leyvand et al. |
| 8,744,121 B2 | 6/2014 | Polzin et al. |
| 9,134,126 B2 | 9/2015 | Kimura |
| 2002/0024500 A1* | 2/2002 | Howard ............ 345/158 |
| 2003/0125719 A1 | 7/2003 | Furnish |
| 2004/0136083 A1* | 7/2004 | Wang et al. ............ 359/642 |
| 2005/0251116 A1 | 11/2005 | Steinke et al. |
| 2007/0017993 A1 | 1/2007 | Sander |
| 2007/0075997 A1 | 4/2007 | Rohaly et al. |
| 2007/0078500 A1 | 4/2007 | Ryan et al. |
| 2007/0189750 A1 | 8/2007 | Wong et al. |
| 2007/0252074 A1 | 11/2007 | Ng et al. |
| 2007/0297784 A1 | 12/2007 | Wong et al. |
| 2008/0232680 A1 | 9/2008 | Berestov et al. |
| 2008/0259354 A1 | 10/2008 | Gharib et al. |
| 2009/0231278 A1* | 9/2009 | St. Hilaire et al. .......... 345/158 |
| 2010/0138785 A1* | 6/2010 | Uoi et al. ............ 715/810 |
| 2010/0306713 A1 | 12/2010 | Geisner et al. |
| 2011/0025689 A1 | 2/2011 | Perez et al. |
| 2011/0150271 A1 | 6/2011 | Lee et al. |
| 2011/0301934 A1 | 12/2011 | Tardif |
| 2011/0310007 A1 | 12/2011 | Margolis et al. |
| 2012/0026349 A1 | 2/2012 | Ishii et al. |
| 2012/0047468 A1 | 2/2012 | Santos et al. |
| 2012/0050157 A1 | 3/2012 | Latta et al. |
| 2012/0076362 A1 | 3/2012 | Kane et al. |
| 2012/0236170 A1 | 9/2012 | Li |

FOREIGN PATENT DOCUMENTS

| | | |
|---|---|---|
| JP | 11-132748 | 5/1999 |
| JP | 2002-518914 | 6/2002 |
| KR | 10-2012-0041839 | 5/2012 |
| KR | 10-2012-0109722 | 10/2012 |
| WO | WO 98/59312 | 12/1998 |
| WO | WO 02/096478 | 12/2002 |
| WO | WO 2006/009786 | 1/2006 |
| WO | WO 2007/041542 | 4/2007 |
| WO | WO 2010/028176 | 3/2010 |
| WO | PCT/US2009/004362 | 4/2010 |
| WO | PCT/US2009/004362 | 1/2011 |
| WO | PCT/US2012/059077 | 12/2012 |
| WO | PCT/US2013/078308 | 5/2014 |
| WO | PCT/US2012059077 | 7/2014 |
| WO | PCT/US2013/078308 | 7/2015 |

OTHER PUBLICATIONS

Nagata, et al., "Depth Perception from Image Defocus in a Jumping Spider", Science, 2012, vol. 335, pp. 469-471.

Sinofsky, E., et al., "Measurement of laser beam spreading in biological tissue scattering", Proceedings of the SPIE—The International Society for Optical Engineering, 1987, vol. 712, pp. 58-62.

Wu, M., et al., "Three-dimensional fluorescent particle tracking at micron-scale using a single camera", Experiments in Fluids, 2005, vol. 38, pp. 461-465.

Lowe, David G., "Object Recognition from Local Scale-Invariant Features", Proc. of the International Conference on Computer Vision, Corfu, Sep. 1999, pp. 1-8.

Tian, Ying-Li, et al., "Absolute Head Pose Estimation From Overhead Wide-Angle Cameras", IEEE International Workshop on Analysis and Modeling of Faces and Gestures, Oct. 17, 2003, pp. 1-8.

U.S. Appl. No. 14/143,832 Non-Final Office Action, Dec. 18, 2015.

Wu, J., et al., "A Comparative Study of SIFT and its Variants", Measurement Science Review, 2013, vol. 13, No. 3, pp. 122-131.

\* cited by examiner

IMAGING SURROUND SYSTEM FOR TOUCH-FREE DISPLAY CONTROL

CROSS-REFERENCE TO RELATED APPLICATIONS

This application is a continuation of PCT Application Serial No. PCT/US2012/059077, filed Oct. 5, 2012, which claims priority to U.S. Provisional Application Ser. No. 61/583,539, filed Jan. 5, 2012, U.S. Provisional Application Ser. No. 61/589,182, filed Jan. 20, 2012, and U.S. Provisional Application Ser. No. 61/590,251, filed Jan. 24, 2012, all of which are incorporated herein by reference in their entirety for all purposes.

BACKGROUND

Imaging systems introduced in the computer gaming and associated display control field have made a tremendous impact. Systems offered by Microsoft (KINECT) and Sony (PLAYSTATION MOVE) have been disruptive in the marketplace in creating massive sales numbers of new gaming systems. The tremendous popularity of especially the KINECT system can be traced to the root of expanded play and control capacity of hardware within the game environment. Now instead of simply manipulating a keypad, a character (avatar) within a game environment runs, jumps or dances in coordinated action with a player's own digitized body movements.

The PLAYSTATION MOVE is reported as a motion-sensing game controller platform for the PlayStation 3 (PS3). Based on the popular game play style of Nintendo's Wii console, the PlayStation Move uses a camera to track the position of a lighted wand with inertial sensors in the wand to detect its motion. Another wand/object tracking system for video game control is disclosed in U.S. Pat. Nos. 7,843,429 and 8,068,095.

Unique to the KINECT system is the ability to capture and control video (including video game) function by gesture recognition. The KINECT system reported to employ a color camera and depth sensor, where the depth sensor employs an infrared projector and a monochrome sensor. Various patents assigned to Microsoft Corp (e.g., US Publication Nos. 20120050157; 20120047468 and 20110310007) further detail applicable hardware and software for image analysis and capture applied to for purpose of computer or video game navigation or control. US Publication No. 20110301934 addresses gesture capture for the purpose of performing sign language translation. Further examples incorporated by reference in this last publication include: U.S. patent application Ser. No. 12/475,094 entitled "Environment and/or Target Segmentation", filed 29 May 2009; U.S. patent application Ser. No. 12/511,850, entitled "Auto Generating a Visual Representation", filed 29 Jul. 2009; U.S. patent application Ser. No. 12/474,655, "Gesture Tool" filed on May 29, 2009; U.S. patent application Ser. No. 12/603,437, "Pose Tracking Pipeline," filed on Oct. 21, 2009; U.S. patent application Ser. No. 12/475,308, "Device for Identifying and Tracking Multiple Humans Over Time," filed on May 29, 2009, U.S. patent application Ser. No. 12/641,788, "Motion Detection Using Depth Images," filed on Dec. 18, 2009, U.S. patent application Ser. No. 12/575,388, "Human Tracking System," filed on Oct. 7, 2009; U.S. patent application Ser. No. 12/422,661, "Gesture Recognizer System Architecture," filed on Apr. 13, 2009; U.S. patent application Ser. No. 12/391,150, "Standard Gestures," filed on Feb. 23, 2009 and U.S. patent application Ser. No. 12/474,655, "Gesture Tool" filed on May 29, 2009.

Whether employing a form of stereo imaging, or using the aforementioned depth sensor to map various z-axis planes on a full color captured image, none of the referenced systems contemplate hardware and software systems as provided herein.

Indeed, given that the commercial embodiment of the KINECT relies on structured light projection technology its 3D depth detection sensitivity is quite limited. The system requires large movements of the hands or body in order to render correct gesture recognition—as do time-of-flight based sensors.

Systems such as the KINECT or others relying on dynamic or passive stereoscopic arrangement rely on feature matching and triangulation calculations to recognize 3D coordinates of objects such as hand or arms. Furthermore, it is important to note that in order for stereo systems to perform the triangulation process, the optical axis of the imaging systems (e.g. dual cameras) and structured-light projection system must be fixed with respect to each other with known calibration parameters. Any deviation from these fixed angles would result in poor depth construction and thus gesture recognition.

Consequently, the elements of the KINECT system are arranged in fixed position, separated across the face of bar-shaped housing. Likewise, other systems used for stereo imaging where various hardware components are combined are designed to be connected to establish a fixed and predetermined relationship between the different camera components. See U.S. Pat. Nos. 7,102,686, 7,667,768; 7,466,336, 7,843,487; 8,068,095 and 8,111,239.

More generally, in a typical stereo imaging system, the cameras are fixed in a position known relative to one another. Over a limited angle range of angles, features (such as by SIFT programming) are extracted from each scene captured from first and second cameras. The feature data is combined with calibration data to extract 3D coordinates from the features and then to coordinate user interface/control based on detected motion or otherwise.

In another multi-camera system, U.S. Pat. No. 8,111,904 describes methods and apparatus for determining the pose, e.g., position along x-, y- and z-axes, pitch, roll and yaw (or one or more characteristics of that pose) of an object in three dimensions by triangulation of data obtained from multiple images of the object. In a method for 3D machine vision, during a calibration step, multiple cameras disposed to acquire images of the object from different respective viewpoints are calibrated to discern a mapping function that identifies rays in 3D space emanating from each respective camera's lens that correspond to pixel locations in that camera's field of view. In a training step, functionality associated with the cameras is trained to recognize expected patterns in images to be acquired of the object. A runtime step triangulates locations in 3D space of one or more of those patterns from pixel-wise positions of those patterns in images of the object and from the mappings discerned during calibration step.

Various multi-camera and/or single-camera, multi-aperture "defocusing" imaging systems to the inventor hereof are also described in the patent literature. See U.S. Pat. Nos. 6,278,847; 7,006,132; 7,612,869 and 7,612,870. These operate in a manner such that the recorded position of matched point/feature doublets, triplets, etc. are measure in relation to one another against a fixed calibration set or otherwise know relationship between/within the image capture means to generate Z-axis values from imaged X-Y coordinate information.

Each of the aforementioned imaging systems is limited in some fashion. Of the commercially-available systems, the PLAYSTATION MOVE requires a wand and the KINECT system offers limited resolution (as further defined herein) and depth of field. All of the stereo imaging approaches further require feature matching and depth extraction by triangulation or other known effect—all leading to computational intensity. Furthermore, it is important to note that in order for stereo systems to perform the triangulation process, the optical axis of the imaging systems (e.g. dual cameras) and structured-light projection system must be fixed with respect to each other with known calibration parameters. Any deviation from these fixed angles would result in poor depth construction and thus gesture recognition. Whether based on stereo imaging triangulation or time-of-flight, such systems require careful calibration, complicated optics, and intensive computational resources to measure the 3D objects in order to capture 3D gestures. Defocusing approaches can also be computationally intensive and may in some cases require marker feature application (e.g., by contrast, projected light, etc.) for best accuracy. The multi-camera pose-based approach described in the '904 patent is perhaps the most computationally intensive approach of all.

In addition to the above, because of their inherent constraints, current systems do not allow for the pairing of arbitrary cameras and display systems in order to render depth measurements, thereby requiring the purchase of a system in its entirety as opposed to creation of a gesture recognition system from separate hardware components. Without the teachings herein, it is not currently possible to take advantage of a gesture recognition system using separate camera hardware components such as a computer and a smartphone or a smart television and a networked camera that can be set up in a matter of minutes with few limits on the placement of the various camera components.

Systems are provided that operate outside of stereo imaging principles, complex computation or calibration requirements and/or noted hardware limitations. Thus, the systems offer advantages as described below and as further may be apparent to those with skill in the art in review of the subject disclosure.

SUMMARY

Inventive aspects herein include each of hardware and various system configurations, methods of software controlling the hardware, methods of user interaction with the hardware, data structures created and manipulated with the hardware and other aspects as will be appreciated by those with skill in the art upon review of the subject disclosure.

In one aspect, in a manner similar to how a surround sound audio system combines disparate speakers into a cohesive audio environment, the subject system hardware and methodology can combine disparate cameras into a cohesive gesture recognition environment. As long as the objective of the gesture recognition process is to render or result in an intended control function, it can be achieved by positioning two or more cameras with non-coaxial axes to detect and lock onto an object image regardless of its depth coordinate. Each camera "sees" one 2D view of the gesture, and the multitude of 2D gestures are combined to infer the 3D gesture. Notably, the 3D object does not need to be measured to reconstruct the 3D gesture. For example, if one camera sees an object expanding and the second camera sees it moving towards the first camera, it can be inferred that the object is moving towards the first camera without knowing anything about the 3D shape of the object.

More specifically, this disclosure presents systems, methodology and a set of tools for dynamic object and gesture recognition for applications such as:
touch-free control of large area displays (e.g. moving a cursor on the screen or turning TV functions on or off) through a 3D "surround" gesture recognition system;
creating touch-free laptop or desktop monitors by creating a micro surround gesture recognition system; and/or
making an interactive kiosk or gambling machine display that works without physical contact.

Still, these examples are provided in a non-limiting sense.

Currently, there are many off-the-shelf image recognition programs that can identify an object from its shape regardless of its scale. Such routines work almost flawlessly as long as the initial planar (XY) location of the object is narrowed to a finite small area. In contrast, operation according to one aspect of the present invention eschews operation within such a limited area/volume. Instead, the crucial step of object recognition can be achieved via a certain predefined motion of the object as the signal for the onset of the object and gesture detection. Exemplary gestures include a rapid hand waving or a circular motion of index finger. Therefore, initial recognition of the object may be based on the type of the motion that it goes through rather than its actual shape or physical configuration. However, in some cases shape recognition of an object might be preferred for triggering the gesture recognition process.

In instances where shape recognition is employed, once two non-coaxially located cameras see a similar motion or shape (in 2D) from their respective Z-direction (i.e., on a XY plane normal to their Z axis), they trigger a software program that accurately categorizes the shape and its XY motion from each respected z direction. There are many scale invariant image processing software applications that can conduct the aforementioned function, once the initial approximate location of the object with a given predefined motion is identified.

By way of comparison, detection of motion in Z (depth) is usually a difficult task for stereo and defocusing camera systems where the Z information is embedded in XY plane with ambiguities that would result from scale change that results in non-deterministic motion of boundaries of the object. Considering the cross-sectional image of a cone that moves along its axis (Z-view), at any instant it would not be clear to the observer if the expansion of the circular cross section is due to movement along Z-axis or expansion (inflation, deformation) of the cone at that given cross section.

However, according to the non-stereo, non-defocusing imaging approaches taught herein, ambiguity can be resolved once a non-coaxial view is provided. Therefore, in stereo and defocusing techniques sensitivity in Z-motion detection is usually far inferior to their XY motion detection capabilities.

Instead, the subject motion detection scheme offers equal (in the idealized case and—otherwise—substantially equalized) sensitivity in Z, X and Y motion detection once the same object is identified in both cameras and the shape and/or motion is only analyzed in the XY planes of the respected Z. As contemplated, the z-motion detection for the first camera is provided by the XY-motion of the object viewed by the second camera and vice versa. (Notably, in the present context is should be understood that "pure" differentiated plan views (e.g., XY, YZ, XZ) occur when the cameras are at 90 degrees to one another. However, different embodiments herein work with the cameras set at various angles, so the planes referenced above and elsewhere herein may instead be "hybridized" (i.e., include components of other views.)

Accordingly, a "surround" gesture recognition system as taught herein is provided with various features. In it, a first/primary camera may be located at the display plane with its Z axis parallel with a Z axis of the display (or—stated otherwise—with the camera Z axis generally perpendicular to the plane of the display). However, in general, the camera can be placed anywhere as long as it "sees" the object of interest. In addition, a second/secondary camera is provided with a non-parallel axis with respect to the display (or the first/primary camera if it is otherwise situated). The angle between these axes would be optimally at 90 degrees. However, as noted above, the scheme works for many non-zero angles so long as sufficient information along the primary camera's optical axis can be obtained. In those instances where SIFT (or related shape recognition processing) is employed the angle between cameras is preferably at least 30 or above, more preferably it is above about 45 degrees and most preferably above about 60 degrees. Visible or IR illumination is provided for of imaged volume. This illumination may be pulsed/intermittent or continuous. As such, the system may include its own provision for lighting or rely on external/ambient lighting.

An input tool employed can be a hand, finger or a hand-held object that is moved during system use. Optionally, a Scale-Invariant Feature Transform (SIFT) recognition software or related Speeded Up Robust Features (SURF) software equivalent may be employed to recognize the gesture "tool" in one or both camera views (or further multiple views if more than two cameras are used).

In any case, the selected software may be triggered by a pre-set motion of the gesture tool. The motion can be a rapid movement of the hand, fingers or any hand held object. The predefined motion can be identified by a matching process (e.g. cross correlation scheme) conducted on sets of time sequenced images from the same or different cameras. A look-up table of gestures can be used for efficient identification. Independent 2D gestures captured by each camera can be identified by such matching. The multiple gestures may then be combined to determine the equivalent 3D gesture, without needing to determine features of/for the 3D object. More broadly, such an approach can be employed simply to calculated/determine a 3D path or trajectory of the tool. Such a determination may track like a mouse pointer for user input/interface control or may be otherwise employed.

Notably, in this example, the angle between the cameras need not be as great as 30 degrees because feature recognition is not required (see discussion of Lowe, below, where such activity is problematic—at best—with camera angles of less than 30 degrees). And while systems operating at over 30 degree angle between the cameras offer various advantages, meaningful/useful embodiments may be practiced with angular ranges between the primary and secondary cameras of about 10 to about 30 degrees. In these, no feature recognition is employed. Rather, a process as described above (or another) may be used.

The subject inventions include software adapted to manipulate data structures to embody the methodologies described. These methodologies necessarily involve computational intensity beyond human capacity. They must be carried out in connection with a processor (i.e., standard or custom/dedicated) in connection with electronic (i.e., magnetic, spintronic, etc.) memory. As such, the necessary hardware includes computer electronics. The hardware further includes an optical system with one or more sensors as described above provided in an arrangement suitable for defocusing imaging.

Additional software (optionally encrypted) may be provided to connect the various cameras. Encrypted communication between the camera(s) and the primary unit(s) may be of use insure user privacy and authenticity. Encrypted communication can also be used to insure the secondary (e.g., additional cameras) is approved/validated (e.g., a licensed application).

Concerning the hardware and various systems, many options are presented. The system hardware typically involves physically separate camera units. The decision to separate the components is not a mere matter of design choice. The pieces are separate, rather than integral, in order to satisfy the function of setup to provide adequate view axis differentiation for functioning, and, optionally, to do so without encumbering the working environment with gross support structure.

Still, in certain embodiments, the cameras may be structurally connected as by a flex-hose or boom for an overhead camera interface, or the camera(s) may be integrated into kiosk panel(s) facing in different directions. In another example, one camera may be embedded at or near the track pad of a laptop keyboard, and another in a video screen bezel.

In yet another example, one or more cameras are incorporated in audio surround-sound speakers. One camera may be located on a viewing centerline as part of a display, and another camera with one side-channel surround speaker. Alternatively, cameras can be located in each of two front channel audio speakers. Other options exist as well.

The difference in viewpoint between the cameras may be characterized by distance between the cameras as by their angle. Two widely spaced cameras incorporated in speakers setup for stereo audio imaging (e.g., 2 m each apart from a center) can be used in the subject imaging—which is non-stereo in nature. Depending on the focal position, a large planar separation can be thus observed.

However, it is more common that the embodiments herein are practiced with at least one camera centered on an axis of where image object movement and/or position will be concentrated. The second camera can also be positioned with an orthogonal or perpendicular view. If not setup as such, the system may include capacity to account for deviation from perpendicular viewing angles.

Each of the latter considerations may be important in an advantageous embodiment in which the cameras comprise hardware incorporated in a pair (or trio) of smart phones. These may be setup by a user (perhaps employing custom stands/braces) each bringing one to a friendly game. With the addition of a monitor, a game of virtual table-tennis, dodge-ball, dance or anything else is possible. The game may be two-player as described or a single-player challenge, etc. In any case, an aspect of the invention involves camera repurposing as described.

Such a system may comprise two or more cellphone cameras communicating through WiFi (local WiFi or cellphone service provider) or Bluetooth. Other options for wireless image transfer exists as well including—but not limited—to WiFi Direct, WiDi, and wireless USB. One can also envision many variations and combinations of cellphones, web cams and embedded computer monitor cameras and display cameras as components of the surround gesture recognition system. The system software can be run by a general purpose computer, an Application Specific Integrated Circuit (ASIC) or run by software embedded in the components included in the referenced cameras, tablets, or otherwise.

More generally, the system may comprise a combination of one, two or more smart phones, laptop computers or tablet computers with cameras or webcams (arranged with non-coaxial optical axes) and wired or wireless image or data transmission capabilities (e.g., as in Bluetooth or WiFi, etc.), and a display system capable of receiving signals from the said computer or tablet computer with camera systems or a computer (laptop) with display system and software to receive images from paired camera(s). The first (or primary) camera can be that of laptop computer or a designated camera embedded on/with a computer and/or television display. Alternatively, the first camera can be a web cam attached to a display and having the same optical axis as that of the display. The second (or secondary) camera can be any camera or camera-equipped device such as a webcam or smart cell phone (e.g., I PHONE or ANDROID) with wireless or wired connection to the computer or television display including a processor. Likewise, a device with front and back cameras can have one repurposed for in the subject approach, with the optics of one or the other re-routed to provide the second channel. In any case, the given hardware setup operates according to principles as further described below.

The proposed systems offer various potential advantages over other systems depending on configuration including:
- optionally, not requiring fixed viewing angles between cameras;
- optionally, not requiring fixed light projection angle with respect to the imaging cameras' axes;
- optionally, not requiring calibration;
- optionally, not requiring extensive computations associated with the triangulation schemes;
- optionally, configuration allowing quick setup like an audio (or in conjunction with) surround sound system because exact positioning of the cameras is not required;
- optionally, covering much larger volume than a comparable stereo imaging or defocusing imaging system; and
- optionally, offering flexibility for combining various hardware components to create a three dimensional system (e.g., Smart phone and computer or Webcam and television in various permutations.)

Yet, while the subject surround gesture control is sufficient for relative gestures as described above, it may be of limited use for recording/effecting/translating absolute 3D gestures. This means that while the user can move a cursor a desired amount and direction, the user cannot may not be able to move the cursor to an absolute location. Consequently, the gesture control is more like using a mouse than a touchscreen. To gain absolute 3D gesture control, the coordinate systems of the various cameras used in system must be locked. This can be done through calibration.

After calibration, the user can either use a gesture to perform a function, or actuate the interface in specific locations. For example, the user could wave his hand to scroll through icons, then select the desired icon by pointing at it directly.

Depending on the level of absolute control desired, three levels of calibration may be employed. Per above, if only relative control is needed, calibration is not necessary. The cameras only need to be pointed such they have a common area of view where the gestures will be performed. If the coordinate system of the primary camera is known (e.g., because the camera is fixed/integrated within a dedicated display system, then only the secondary camera needs to be calibrated to offer absolute 3D gesture control. Thus, moving a known target to different points in space is enough to establish the coordinate system of the secondary camera. The apparent position of those points in both cameras can be used to determine the unique view angle of the secondary camera. If all of the cameras are unknown, then the coordinate systems of both cameras are "locked" to the display in order to deliver absolute 3D gesture control. To do this, one moves a known target towards specified targets on the display. The vector of the target motion provides an absolute reference to determine the view angle. This allows the system to calculate the relative coordinate systems between the cameras, each other, and the display.

In any case, numerous inventive embodiments are provided herein. These may be individually claimed or claimed in combination. In so doing, it is specifically contemplated that they may be distinguished from the noted BACKGROUND material by way of any form of "negative" limitation, including claim-specific disclaimer of the noted technology as falling outside the subject claim scope.

BRIEF DESCRIPTION OF THE DRAWINGS

The figures provided are diagrammatic and not drawn to scale. Variations from the embodiments pictured are contemplated. Accordingly, depictions in the figures are not intended to limit the scope of the invention.

DETAILED DESCRIPTION

Various exemplary embodiments are described below. Reference is made to these examples in a non-limiting sense. They are provided to illustrate more broadly applicable aspects of the present inventions. Various changes may be made and equivalents may be substituted without departing from the true spirit and scope of the inventions. In addition, many modifications may be made to adapt a particular situation, material, composition of matter, process, process act(s) or step(s) to the objective(s), spirit or scope of the present inventions. All such modifications are intended to be within the scope of the claims made herein.

Figure 1:
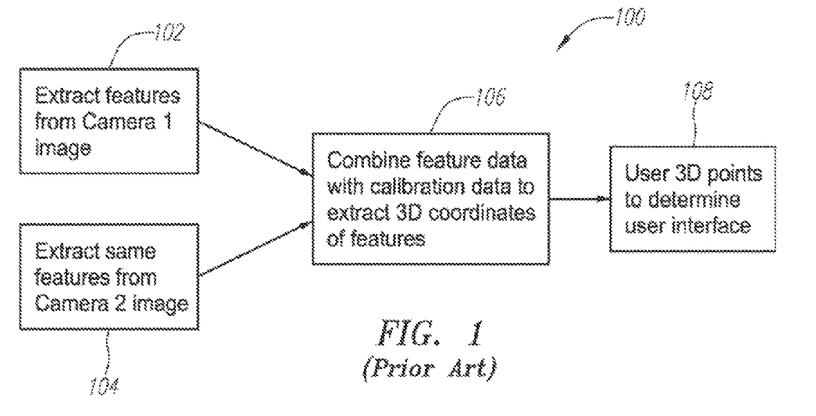
FIG. 1 is a flowchart illustrating a general approach know for accomplishing stereo imaging.

FIG. 1 illustrates a prior art process for a typical stereo imaging approach. In method 100, as in any typical stereo system, the cameras need to be fixed relative to one another, and to not have too large of an angle between cameras that will be used to extract 3D data. Limitation on angle depends on a number of factors including shadowing or obscuring of features. In any case, depending on the subject to be imaged, angles greater than 30 degrees can become quite problematic. Largely, the limitation derives from steps 102 and 104 in which a first camera is used at 102 to extract features of an object (e.g., SIFT, SURF or other programming methodology) and a second camera is used to extract the same feature.). See Lowe, "*Object Recognition from Local Scale-Invariant Features,*" Proc. of the International Conference on Computer Vision, Corfu (September 1999) discussing the limitations of SIFT in performing robust recognition of 3D objects to over/across only about a 20 degree range of rotation. As noted above, feature match-up is required. With matching features, that data is combined with calibration data at 106 to extract 3D coordinates (data points) for those features. Then, at 108, the 3D points are employed in control or display for the user interface.

Figure 2:
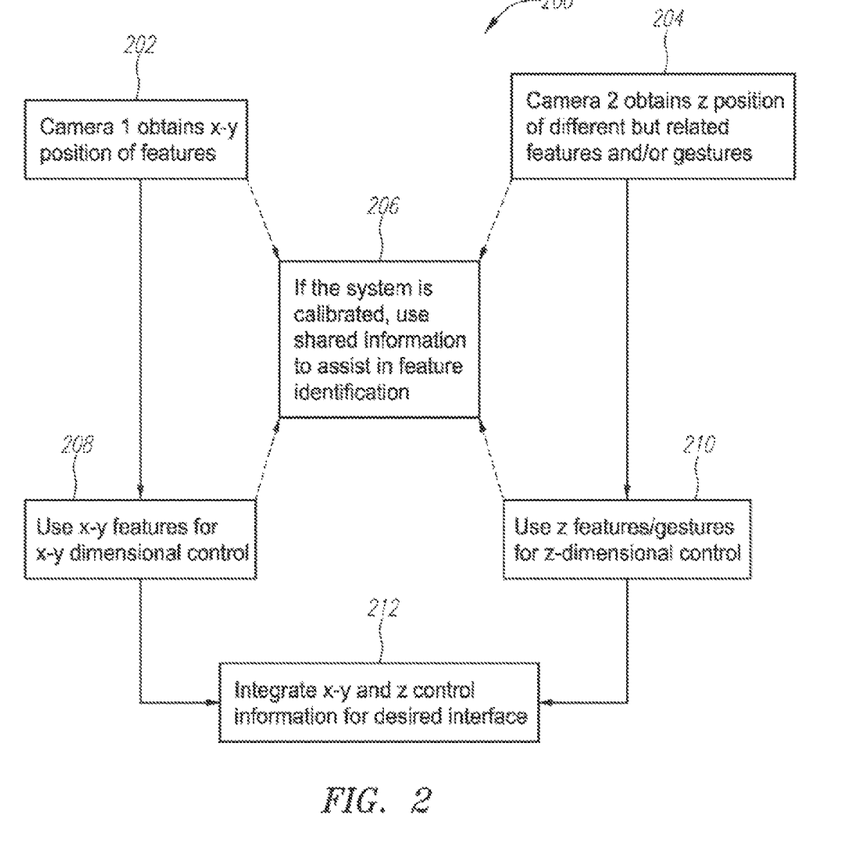
FIG. 2 is a flowchart illustrating operation of the subject method as distinguished from stereo imaging.

FIG. 2 is a flowchart illustrating operation of the subject hardware according to a method 200. It assumes two cameras, with Camera 1 facing toward the user and Camera 2 from another angle—above/below or to the side. In contrast to the above, the features captured from Camera 1 and Camera 2 are not necessarily the same. For hand-gesture based control, the intent is to identify hand-like areas, but the recognized points need not be identical—merely related.

In method 200, Camera 1 obtains x-y position of relevant x-y features at 202. Such features may be deemed "relevant" in that they are characterized as hand gestures, for example, in accordance with one or more of the Examples presented below. At 204, Camera 2 obtains z position of different but related features or gestures. Per above, such features or gestures may be deemed "related" in that they are also associated with hand position or motion.

If the cameras (or associated system hardware such as included lens optics, sensors, etc.) are calibrated, at 206, a processor manipulating the captured camera data from 204 and 206 uses shared information to help identify which features are useful. One way to use calibration is to take advantage of the fact that the 2D images will (in the sense intended above) "share" a dimension. For example, a camera facing a person and one facing down from the ceiling would share the dimension running horizontal with respect to the person. Thus, once the front facing camera has captured data in a region of interest, relevant points from the other camera could be restricted to a thin horizontal band or slice of the imaged area.

Regardless, at 208, the processor uses x-y features for x-y dimensional control, such as captured hand motion to emulate the movement of a mouse on a display screen. At 210, the processor uses z features or gestures for z-dimensional control, such as captured in-out motion of a user's hand to emulate the clicking of a mouse. Ultimately, at 212, the process may integrate x-y and z control information for desired interface control and/or display.

Figure 3A:
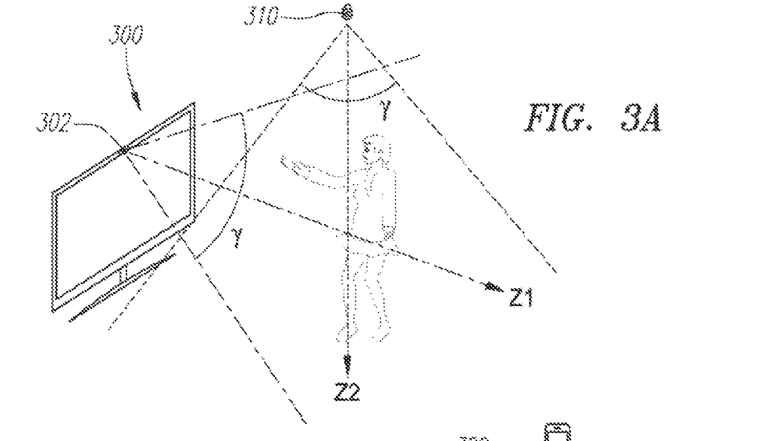
FIGS. 3A and 3B illustrate related hardware system implementations for large field imaging.
Figure 3B:
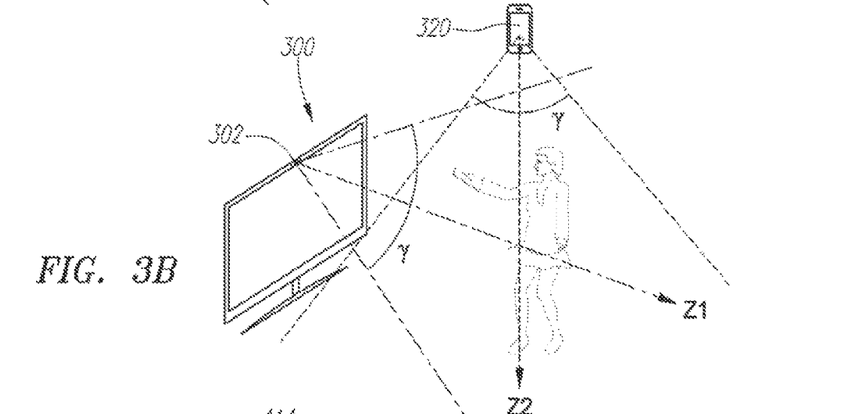

Suitable hardware for large (or small) display control, associated gaming, etc. is shown in FIGS. 3A and 3B. In each figure, a display 300 is shown, incorporating a camera 302 with a field of view over a range α. An optical axis of the camera is indicated by axis Z1. In FIG. 3A, a second camera is depicted as a wireless web cam 310. It offers a field of view over a range β and an optical axis Z2.

Axes Z1 and Z2 may be set perpendicular or at another angle. They may be at the same level or however else convenient. The robust nature of the subject system allows for significant angular variation. This variation may be a result of either inaccurate or fairly arbitrary user setup.

In connection with a web cam 310 made in a more-or-less permanent installation, relatively little angular variation may be expected. However, in a setup such as shown in FIG. 3B, variability in setup may be expected as the norm. The reason being: camera 2 in the setup shown in FIG. 3B is provided in connection with a smart phone 320. Such a device may simply be carried around by a user until setup spontaneously on a furniture ledge. Alternatively, it can be docked in a cradle affixed to a wall when planned for use in creating a desired game space or other display environment.

In any case, it is contemplated that smart phone camera could communicate with the display and any associated electronics through built-in WiFi or Bluetooth communication. It may do so in a role where it merely forwards camera image data that is processed in conjunction with hardware associated with (integrally or connected as a peripheral—not shown) the display. Alternatively, given the robust methodology described, the processor on-board the smart phone may be used for processing steps (i.e., any of acts 206, 208, 210 and/or 210) in the method above or otherwise.

Figure 4:
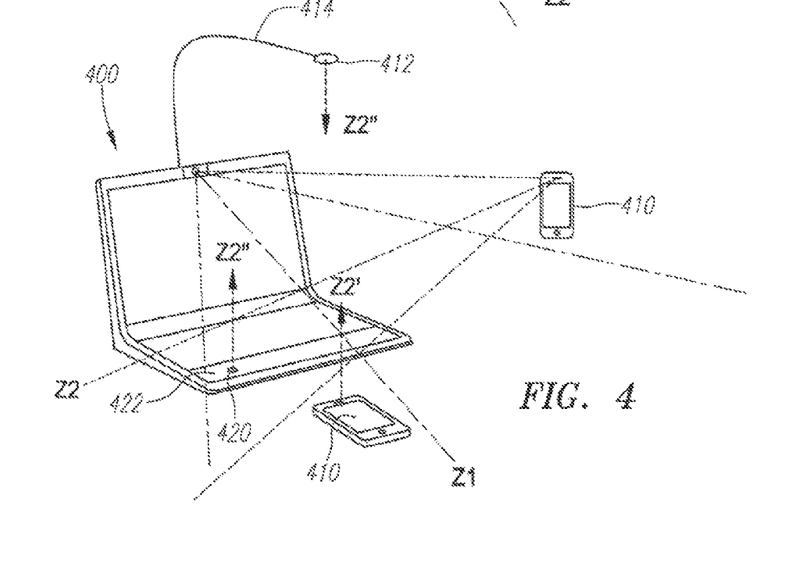
FIG. 4 illustrates hardware implementations for smaller field imaging.

FIG. 4 illustrates another set of hardware options in connection with a laptop computer 400. Clearly, the computer could be used for such processing. Alternatively, optional smart phone 410 (whether located to the side with axis Z2 or with its camera facing upward with axis Z2') can share or handle such processing.

Alternatively a second (or third) camera 412 may be provided overhead in association with an adjustable boom 414. Such a boom by be installed on a desk, and even integrate lamp components to disguise its presence and/or function with utility secondary to defining optical axis Z2" as employed in the subject method(s). Yet another option is to integrate an upward facing camera 420 in the hand rest 422 area of the computer. All said, a number of options exist.

Figure 5A:
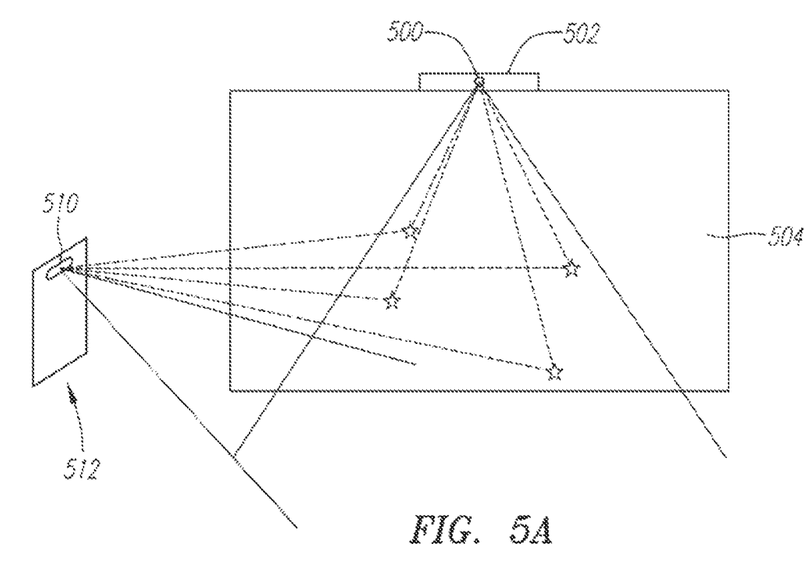
FIG. 5A depicts another system implementation concerning second/secondary camera calibration.
Figure 5B:
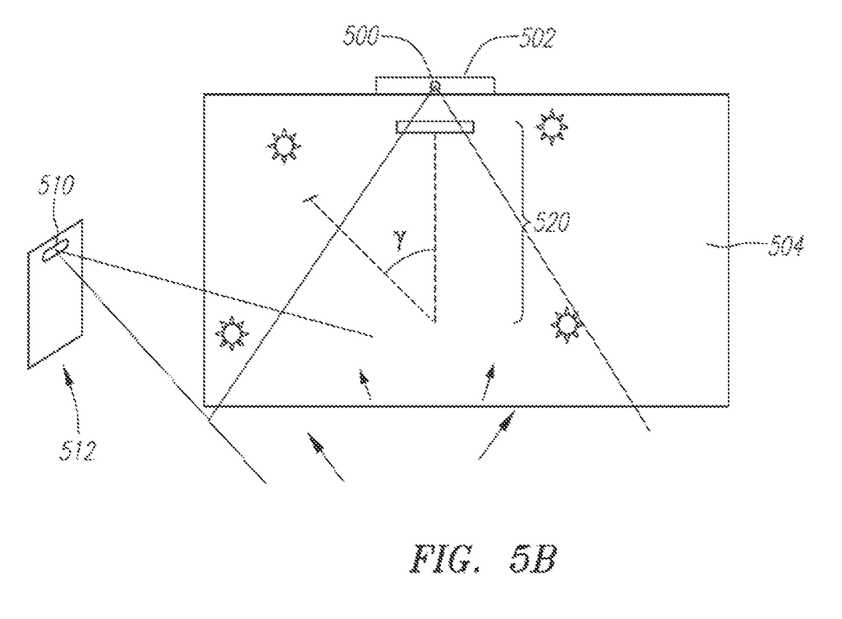
FIG. 5B depicts a final system implementation in which both/all cameras are calibrated to a coordinate system.

FIGS. 5A and 5B illustrate still other hardware options. In these, a first camera 500 is provided in connection with a housing 502 set atop a non-custom display 504. A second camera 510 is integrated in a side-positioned surround-sound speaker 512 (the speaker examples illustrated as in-wall units). Housing 502 advantageously includes the requisite processor and other electronic components. Speaker units 512 may be wireless (for each of the camera and music-center signals) or may be connected by wiring.

As referenced above, to gain absolute 3D gesture control, the coordinate systems of the various cameras used in system need to be locked through calibration. FIGS. 5A and 5B illustrate options in this regard.

FIG. 5A depicts determination of a coordinate system for absolute gesture recognition for the secondary camera 510 where a coordinate system of the primary camera 500 is known. Comparing the apparent position of common objects (stars—as potentially embodied by a LED-lit wand held and "clicked" to indicate next point by a user) in both cameras allows the system enables determination of the view angle for the secondary camera.

FIG. 5B depicts a final system implementation in which both cameras are calibrated to a coordinate system. In this figure, determination of a coordinate system is made where the coordinate system of neither of the cameras is known. By processing a user pointing (as indicated by arrows) at designated targets (sun icons) on the display, the system is able to determine the relative view angles of both cameras together (as indicated by inset image 520 illustrating angle γ).

Embodiments operating according to and/or expanding upon the principles described above are described below. These have been reduced to practice in varying degree. In any case, they are intended to present non-limiting exemplary variations within the scope of different inventive aspects.

EXAMPLE 1

Camera 1 faced the user with its captured image data processed using SURF features along with Kalman Filters and processing of group flows of points to detect regions of interest. The motion of keypoints in the regions of interest (e.g., a user's hand) where then transformed into the x-y motion of the mouse on the computer screen.

Camera 2 faced down towards a desk with its captured image data processed using background subtraction and a back histogram projection, then a connectedness checking to determine where the hand was positioned. It then used the center of mass and extremum checks to detect motion translated to user input translated to left mouse "clicks" in the interface, loosely gestured in the "z" dimension of the system.

EXAMPLE 2

Motion is used as in Example 1, but only to identify regions of interest. Then, a back-histogram projection in HSV (i.e., Hue, Saturation, and Value) space is used to do a color filtering for skin color, and hand reconstruction from that data. Keypoints and motion are extracted using other techniques, such as edge detectors and background subtraction respectively.

EXAMPLE 3

With a priori knowledge that the user's hand will cover a large portion of the field of view of a camera (such as from a smart phone camera facing upwards as in connection with the laptop embodiment above) then HSV can be employed for hand identification.

Variations

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other shapes of apertures can be used, including round, oval, triangular, and/or elongated. The above devices can be used with color filters for coding different apertures, but can also be used with polarization or other coding schemes.

Those of skill would further appreciate that the various illustrative logical blocks, modules, circuits, and algorithm steps described in connection with the embodiments disclosed herein may be implemented as electronic hardware, computer software, or combinations of both. Indeed, given the type of pixel-to-pixel matching for imaged points and associated calculations required with the data structures recorded and manipulated, computer use is necessary. In imaging any object, vast sets of data are collected and stored in a data structure requiring significant manipulation in accordance with imaging principles—including defocusing principles/equations—as noted herein and as incorporated by reference.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Graphics Processor Unit (GPU), a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form.

A processor may also be implemented as a combination of computing devices, e.g. a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other or client-side runtime languages such as Flash, HTMLS or Silverlight.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 5%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A system for input gesture recognition, comprising:
a first camera having a first optical axis;
a second camera having a second optical axis;
a computer processor, wherein the first and second cameras are connected for data transmission to the computer processor; and
a non-transitory memory having a plurality of instructions stored thereon that, when executed, cause the computer processor to compare images from the first and second cameras and recognize user hand input gestures without the performance of stereo imaging calculations,
wherein the first and second optical axes are angled with respect to one another by at least about 30 degrees.

2. The system of claim 1, wherein the optical axes are angled by at least about 60 degrees.

3. The system of claim 1, wherein the optical axes are angle by about 90 degrees.

4. The system of claim 1, wherein the plurality of instructions, when executed, cause the computer processor to compare images from the first and second cameras and recognize user hand input gestures without the triangulation of matched features within the images.

5. The system of claim 1, wherein the plurality of instructions, when executed, cause the computer processor to compare images from the first and second cameras and recognize user hand input gestures without reference to the angle between the first and second optical axes.

6. The system of claim 1, comprising a first housing and a second housing separate from the first, the first camera adapted to be set in the first housing and the second camera adapted to be set in the second housing.

7. The system of claim 6, wherein the first camera is adapted to be set in the first housing with a primary display.

8. The system of claim 7, wherein the second camera is adapted to be set within a smart phone.

9. The system of claim 7, wherein the second camera is adapted to be set within a tablet computer.

10. The system of claim 7, comprising a laptop computer comprising a keyboard panel section, wherein the primary display is the display of the laptop computer.

11. The system of claim 10, wherein the second camera is housed in the keyboard panel section.

12. The system of claim 10, wherein the second camera is adapted to be housed in a smart phone and the system is adapted such that the smart phone is positionable on a plane parallel with and in front of the keyboard panel section.

13. The system of claim 7, comprising a laptop computer and a boom, wherein the primary display is the display of the laptop computer and the second camera is positionable above the laptop computer by the boom.

14. The system of claim 13, wherein the boom is adapted to be connected to a laptop computer docking station.

15. The system of claim 1, wherein the first and second cameras are wirelessly connected for data transmission.

16. The system of claim 1, wherein the plurality of instructions, when executed, cause the computer processor to perform scale invariant feature recognition for successive images from each camera and generate an output signal corresponding to a gesture from a look-up table corresponding to features recognized from the scale invariant feature recognition.

17. The system of claim 1, wherein the successive images are not sequential.

18. The system of claim 1, further comprising a third camera off-axis from at least one of the first and second cameras.

19. The system of claim 1, wherein the plurality of instructions, when executed, cause the computer processor to compare images from the first and second cameras to recognize user hand input gestures without 3D object reconstruction.

20. The system of claim 16, wherein the plurality of instructions, when executed, cause the computer processor to recognize a gesture motion.

21. The system of claim 1, wherein the processor is configured to recognize hand input gestures alone.

* * * * *